(12) United States Patent
Sahota et al.

(10) Patent No.: US 7,792,759 B2
(45) Date of Patent: Sep. 7, 2010

(54) METHODS FOR PERFORMING TRANSACTIONS IN A WIRELESS ENVIRONMENT

(75) Inventors: Jagdeep Singh Sahota, Rodeo, CA (US); Trudy Hill, Foster City, CA (US); Carole Oppenlander, Pacifica, CA (US); Patrik Smets, Nijlen (BE); Eddy Lodewijk Hortensia Van de Velde, Leuven (BE)

(73) Assignee: EMV Co. LLC, Foster City, CA (US)

( * ) Notice: Subject to any disclaimer, the term of this patent is extended or adjusted under 35 U.S.C. 154(b) by 2370 days.

(21) Appl. No.: 10/628,702

(22) Filed: Jul. 28, 2003

(65) Prior Publication Data

US 2004/0068472 A1    Apr. 8, 2004

Related U.S. Application Data

(60) Provisional application No. 60/399,274, filed on Jul. 29, 2002.

(51) Int. Cl.
G06Q 20/00 (2006.01)
(52) U.S. Cl. .............................. 705/67; 705/44; 705/51; 705/59; 705/60; 380/51; 713/200; 713/201; 235/380; 235/379
(58) Field of Classification Search .................. 705/67, 705/44, 51, 59, 60; 380/51; 713/200, 201
See application file for complete search history.

(56) References Cited

U.S. PATENT DOCUMENTS

| 5,528,222 | A | 6/1996 | Moskowitz et al. |
|---|---|---|---|
| 5,550,358 | A | 8/1996 | Tait |
| 5,774,877 | A | 6/1998 | Patterson, Jr. |
| 5,789,733 | A | 8/1998 | Jachimowicz |
| 5,793,301 | A | 8/1998 | Patterson, Jr. |
| 5,796,832 | A | 8/1998 | Kawan |
| 5,797,002 | A | 8/1998 | Patterson, Jr. |
| 5,828,044 | A | 10/1998 | Jun et al. |
| 5,869,825 | A | 2/1999 | Ziarno |
| 5,870,722 | A | 2/1999 | Albert |
| 5,880,769 | A | 3/1999 | Nemirofsky |
| 5,907,832 | A | 5/1999 | Pieterse et al. |
| 5,915,245 | A | 6/1999 | Patterson, Jr. |
| 5,943,624 | A | 8/1999 | Fox |
| 5,991,410 | A | 11/1999 | Albert |
| 5,991,749 | A | 11/1999 | Morrill, Jr. |

(Continued)

OTHER PUBLICATIONS

EMVCO, *Electromechanical Characteristics for Cards and Terminals operating at 5V, 3V and 1.8V,Book I, Amendment I, EMV2000 Integrated Circuit Card Specification for Payment Systems*, Version 1.0, Jan. 2003.

(Continued)

*Primary Examiner*—Evens J Augustin
*Assistant Examiner*—Shahid Kamal
(74) *Attorney, Agent, or Firm*—Bradley K. DeSandro; Quarles & Brady LLP

(57) ABSTRACT

A method of performing a transaction over a contactless interface placing a first device in wireless communication with a second device, selecting the interface over which the first and second device will communicate, selecting the application to be used to approve or disapprove the transaction, communicating to the second device the data necessary for the application to approve of disapprove the transaction.

35 Claims, 6 Drawing Sheets

U.S. PATENT DOCUMENTS

| | | | |
|---|---|---|---|
| 6,038,549 | A | 3/2000 | Davis |
| 6,041,314 | A | 3/2000 | Davis |
| 6,073,840 | A | 6/2000 | Marion |
| 6,076,073 | A | 6/2000 | Pieterse et al. |
| 6,078,806 | A | 6/2000 | Heinonen |
| 6,101,477 | A | 8/2000 | Hohle |
| 6,105,006 | A | 8/2000 | Davis |
| 6,148,405 | A | 11/2000 | Liao |
| 6,170,742 | B1 | 1/2001 | Yacoob |
| 6,195,541 | B1 | 2/2001 | Griffith |
| 6,223,291 | B1 | 4/2001 | Puhl |
| 6,305,603 | B1 | 10/2001 | Grunbok, Jr. |
| 6,311,167 | B1 | 10/2001 | Davis |
| 6,321,980 | B1 | 11/2001 | Yazumi |
| 6,331,972 | B1 | 12/2001 | Harris |
| 6,342,844 | B1 | 1/2002 | Rozin |
| 6,356,752 | B1 | 3/2002 | Griffith |
| 6,366,893 | B2 | 4/2002 | Hannula |
| 6,378,073 | B1 | 4/2002 | Davis |
| 6,394,341 | B1 | 5/2002 | Makipaa et al. |
| 6,397,126 | B1 | 5/2002 | Nelson |
| 6,415,156 | B1 | 7/2002 | Stadelmann |
| 6,442,532 | B1 | 8/2002 | Kawan |
| 6,463,534 | B1 | 10/2002 | Geiger |
| 6,480,957 | B1 | 11/2002 | Liao |
| 6,487,180 | B1 | 11/2002 | Borgstahl |
| 6,487,540 | B1 | 11/2002 | Smith |
| 6,505,095 | B1 | 1/2003 | Kolls |
| 6,512,919 | B2 | 1/2003 | Ogawawara |
| 6,539,362 | B1 | 3/2003 | Patterson, Jr. |
| 6,557,752 | B1 | 5/2003 | Yacoob |
| 6,577,229 | B1 | 6/2003 | Bonneau |
| 6,577,861 | B2 | 6/2003 | Ogasawara |
| 6,584,309 | B1 | 6/2003 | Whigham |
| 6,585,598 | B2 | 7/2003 | Nguyen |
| 6,587,835 | B1 | 7/2003 | Treyz |
| 6,590,588 | B2 | 7/2003 | Lincke |
| 6,601,040 | B1 | 7/2003 | Kolls |
| 6,604,086 | B1 | 8/2003 | Kolls |
| 6,604,087 | B1 | 8/2003 | Kolls |
| 6,606,602 | B1 | 8/2003 | Kolls |
| 6,609,655 | B1 | 8/2003 | Harrell |
| 6,609,658 | B1 | 8/2003 | Sehr |
| 6,609,659 | B2 | 8/2003 | Sehr |
| 6,615,186 | B1 | 9/2003 | Kolls |
| 6,622,124 | B1 | 9/2003 | Kolls |
| 6,625,583 | B1 | 9/2003 | Silverman |
| 6,626,356 | B2 | 9/2003 | Davenport |
| 6,641,050 | B2 | 11/2003 | Kelley et al. |
| 6,978,019 | B1 * | 12/2005 | Lapstun et al. ................ 380/51 |
| 2001/0037249 | A1 | 11/2001 | Fitzgerald |
| 2001/0037264 | A1 | 11/2001 | Husemann |
| 2001/0051920 | A1 | 12/2001 | Joao |
| 2002/0023215 | A1 | 2/2002 | Wang |
| 2002/0030579 | A1 | 3/2002 | Albert |
| 2002/0073024 | A1 | 6/2002 | Gilchrist |
| 2002/0073027 | A1 | 6/2002 | Hui |
| 2002/0073042 | A1 | 6/2002 | Maritzen et al. |
| 2002/0077993 | A1 | 6/2002 | Immonen |
| 2002/0087478 | A1 | 7/2002 | Hudd |
| 2002/0107007 | A1 | 8/2002 | Gerson |
| 2002/0111919 | A1 * | 8/2002 | Weller et al. .................. 705/67 |
| 2002/0116330 | A1 | 8/2002 | Hed |
| 2002/0123359 | A1 | 9/2002 | Wei |
| 2002/0143634 | A1 | 10/2002 | Kumar |
| 2002/0143655 | A1 | 10/2002 | Elston |
| 2002/0152178 | A1 * | 10/2002 | Lee ............................ 705/67 |
| 2002/0174016 | A1 | 11/2002 | Cuervo |
| 2002/0181710 | A1 | 12/2002 | Adam |
| 2003/0001459 | A1 | 1/2003 | Scott |
| 2003/0004891 | A1 | 1/2003 | Van Rensburg |
| 2003/0022655 | A1 | 1/2003 | Bogat |
| 2003/0074328 | A1 | 4/2003 | Schiff |
| 2003/0075610 | A1 | 4/2003 | Ong |
| 2003/0125054 | A1 | 7/2003 | Garcia |
| 2003/0125969 | A1 | 7/2003 | Kizer |
| 2003/0130919 | A1 | 7/2003 | Templeton |
| 2003/0135470 | A1 | 7/2003 | Beard |
| 2003/0149662 | A1 | 8/2003 | Shore |
| 2003/0167207 | A1 | 9/2003 | Berardi |
| 2003/0172028 | A1 | 9/2003 | Abell |
| 2003/0187786 | A1 | 10/2003 | Swift |
| 2003/0187796 | A1 | 10/2003 | Swift |
| 2003/0195842 | A1 | 10/2003 | Reece |

OTHER PUBLICATIONS

EMVCO, *EMV '96 Integrated Circuit Card Specification for Payment Systems*, Book 1, Version 3.1.1, May 31, 1998.

EMVCO, *EMV '96 Integrated Circuit Card Specification for Payment Systems*, Book 2, Version 3.1.1, May 31, 1998.

EMVCO, *EMV '96 Integrated Circuit Card Specification for Payment Systems*, Book 3, Version 3.1.1, May 31, 1998.

EMVCO, *EMV2000 Integrated Circuit Card Specification for Payment Systems: Application Independent ICC to Terminal Interface Requirements*, Book 1, Version 4.0, Dec. 2000.

EMVCO, *EMV2000 Integrated Circuit Card Specification for Payment Systems: Security and Key Management*, Book 2, Version 4.0, Dec. 2000.

EMVCO, *EMV2000 Integrated Circuit Card Specification for Payment Systems: Application Specification*, Book 3, Version 4.0, Dec. 2000.

EMVCO, *EMV2000 Integrated Circuit Card Specification for Payment Systems: Cardholder, Attendant, and Acquirer Interface Requirements*, Book 4, Version 4.0, Dec. 2000.

EMVCO, *EMV2000 Integrated Circuit Card Specification for Payment Systems: Analysis of EMV2000 Changes for Backward Compatibility*, Version 4.0, 2000.

EMVCO, *EMV2000 Integrated Circuit Card Specification for Payment Systems: Application Independent ICC to Terminal Interface Requirements*, Book 1, Version 4.1, May 2004.

EMVCO, *EMV2000 Integrated Circuit Card Specification for Payment Systems: Security and Key Management*, Book 2, Version 4.1, May 2004.

EMVCO, *EMV2000 Integrated Circuit Card Specification for Payment Systems: Application Specification*, Book 3, Version 4.1, May 2004.

EMVCO, *EMV2000 Integrated Circuit Card Specifcation for Payment Systems: Cardholder, Attendant, and Acquirer Interface Requirements*, Book 4, Version 4.1, May 2004.

* cited by examiner

FIG. 1
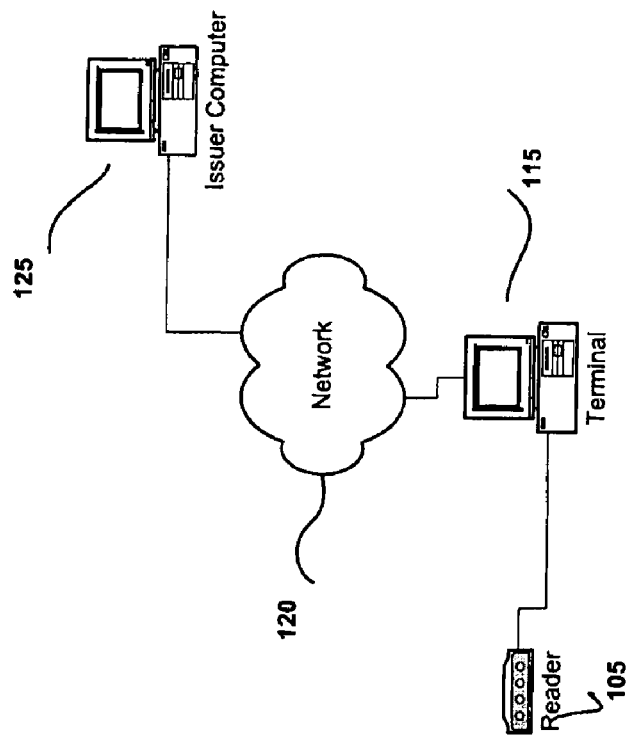
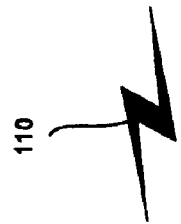
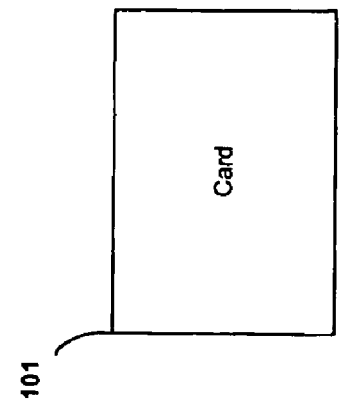

METHODS FOR PERFORMING TRANSACTIONS IN A WIRELESS ENVIRONMENT

CROSS-REFERENCES

This application claims priority to U.S. provisional patent application Ser. No. 60/399,274, filed Jul. 29, 2002 and entitled Contactless Credit Card Payment System and Method.

INTRODUCTION

The present invention provides methods for performing transactions in wireless environments and for selecting the interface and application which will be used in the transaction. More specifically, the present invention provides methods for utilizing an electronic device, such as an integrated circuit card, which is capable of communicating with a point of sale terminal across both a wireless interface and physical contacts present on the card to select the application to be used in the transaction, the interface to be used, and to inform the point of sale terminal of the appropriate data formats which will be used in the transaction.

BACKGROUND OF THE INVENTION

Technological improvements have allowed businesses and individuals to engage in transactions in new and expanding environments. For example, payment of a transaction may now be made over a wireless interface such as in the case of a radio frequency or infrared enabled electronic device. For instance, radio frequency enabled credit cards, also commonly known as contactless cards, typically comprise an integrated circuit, and a coiled antenna. The integrated circuit of a contactless card comprises a processor, memory such as random access memory or electrically erasable-programmable read only memory ("EEPROM"), and a modulator/demodulator for impressing data on a radio frequency wave and decoding received data. The antenna is coiled through the interior of the contactless card and is used to communicate data with an external location. In addition, the coiled antenna inductively couples with an external electromagnetic field and serves as a power source for the contactless card. In addition, wireless transactions may be conducted by any electronic device which is enabled to communicate transaction information over any wireless interface including infrared, radio frequency, laser, or another frequency or communication means or protocol for use therewith.

Contactless cards provide increased cost savings to the issuer of such cards because they do not require contact with a physical card-reading device to receive power or exchange information. Similarly, contactless integrated circuit cards provide significant convenience to the cardholder as they allow a consumer to conduct a transaction more quickly and conveniently than in a contact-based environment. For example, using contactless technology, a consumer could present the card for payment without having to locate their card in their wallet, physically provide the card to the merchant, await the merchant to properly read the card through physical means, receive the card back from the merchant, and replace the card in their wallet. Rather, using contactless technology, the transaction could be conducted without the consumer ever removing the card from their wallet. By eliminating the physical exchanges between the consumer and the merchant, contactless technology will result in significant overall time savings to the consumer even if actual processing time for contactless transactions is longer than for contact-based transactions. In addition, a contactless card never needs to leave the actual possession of the card holder as all of the data necessary to the transaction is transferred over a wireless interface. This feature itself provides the cardholder with a increased level of security as it reduces the likelihood that the card will be passed through an unauthorized reader for purposes of skimming the data on the card and creating a counterfeit card.

Nonetheless, these benefits must be balanced against the potential for security breaches which are presented by contactless cards that are not presented in a contact-based environment. In particular, different security issues arise where information is transmitted between a card and a contactless card reader which information may be intercepted during transmission. Potential security breaches which arise by the use of contactless cards include data "hijacking", data "pick-pocketing" and the "man in the middle" attack.

Hijacking data occurs when a party not involved in a credit card transaction taps into the exchange of data occurring as part of the transaction to extract information being transmitted between a contactless card and a contactless card reader. Not surprisingly, the ability for a fraudulent device to obtain valid data is inversely proportional to the distance between the hijacking device and the card reader and/or the contactless card. In other words, as the hijacking device is permitted to be in closer proximity to card reader and/or the contactless card, the likelihood of the hijacking device successfully obtaining valid data from the transaction is increased.

Pick-pocketing data occurs when a fraudulent device activates and reads the contactless card without the cardholder's knowledge. Data pick-pocketing may even occur when the card is not being used in a transaction as the pick-pocketing device can activate the card and initiate a data exchange. Data is obtained from the card by the fraudulent device using legitimate commands causing the card to evaluate the data exchange as legitimate. Since a contactless card transmits data as radio frequency waves propagating from a single source, a contactless card may be subject to such an attack in locations and from sources of which the cardholder is not aware. Again, the ability for a fraudulent device to obtain valid data is inversely proportional to the distance between the contactless card and the fraudulent device.

A "man in the middle" attack occurs when an exchange between a contactless card and a legitimate card reader is unknowingly intercepted by a third and unauthorized device to the transaction. The third and unauthorized device to the transaction intercepts the data transmitted by the card, copies or otherwise manipulates such data, then transmits such data to the legitimate card reader. When the card reader is returning data or instructions to the card, the third device receives such data and transmits such data to the card. The transaction continues with the third device accepting and re-transmitting all data exchanged between the card and the legitimate card reader. In this fashion, the third device has access to all of the data of the transaction, without the knowledge of either the card holder or the merchant operated card reader.

Because the security risks inherent in a contactless environment may require additional security measures to be performed to secure data during transmission, terminals interfacing with cards need to differentiate between contactless cards and cards that physically contact the terminal. Applications deployed on cards capable of contactless communication with a point of sale terminal may vary and require the use of different types of data, in different formats and with different processing requirements. For example, a single card as used in the present invention may simultaneously have deployed thereon applications which utilize magnetic stripe data and applications which utilize chip data. In this context, magnetic stripe data is that data which is commonly referred to in the industry as Track 1 and/or Track 2 data, as this data is commonly stored on those tracks of the magnetic stripe which appears on the back of non-integrated circuit enabled cards. Chip data is that data which is utilized in the so call smartcard transactions, such as for example the Visa Smart Debit/Credit (VSDC) transactions, and is stored on memory residing on the card itself.

Accordingly, utilizing an integrated circuit card to perform transactions across both a wireless interface with a point of sale terminal and across a contact interface require methods for selecting the application which will be used in the transaction, the interface which will be used in the transaction and the data format which will be used in the transaction. The present invention provides such methods and further provides for their use in the existing environment for credit and debit card transactions with minimal equipment changes to merchant and issuer or service provider equipment.

SUMMARY OF THE INVENTION

The present invention provides a method for performing a transaction between an electronic device, such as an integrated circuit card, and a point of sale terminal wherein the electronic device and the point of sale terminal can exchange data across either a contactless interface or a contact based interface.

As described in more detail herein, the present invention enables the user of such an electronic device, referred to herein as a cardholder, to present to a merchant-operated point of sale terminal information regarding a payment service utilized by the cardholder. Once the cardholder presents the device to a point of sale terminal, the payment service to be used in performing the transaction is selected, the interface by which the transaction information will be exchanged is determined, and the format for exchanging data between the device and the terminal is determined. In a preferred embodiment, the cardholder will select the payment service to be utilized in the transaction from a list of services mutually supported by the point of sale terminal on the contactless card.

Further advantages and aspects of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 1 depicts a system of the present in which a transaction is conducted over a wireless interface.

DETAILED DESCRIPTION OF THE INVENTION

Figure 2:
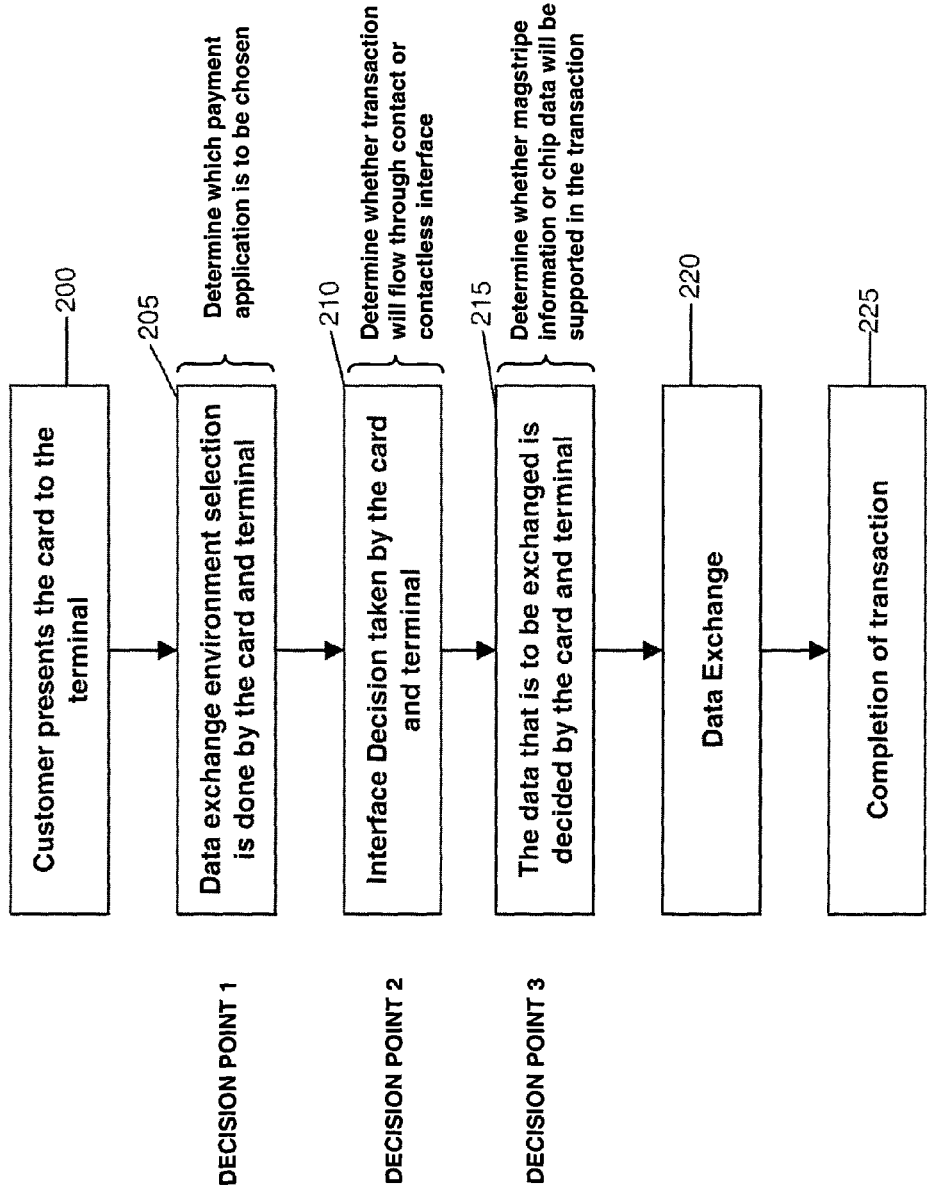
FIG. 2 depicts an exemplary transaction flow for determining the information to be transmitted in a credit-based transaction according to an embodiment of the present invention.

Before the present methods are described, it is to be understood that this invention is not limited to the particular methodologies or protocols described, as these may vary. It is also to be understood that the terminology used in the description is for the purpose of describing the particular versions or embodiments only, and is not intended to limit the scope of the present invention which will be limited only by the appended claims. In particular, although the present invention is described in conjunction with a financial transaction, it will be appreciated that the present invention may find use in any electronic exchange of data.

It must also be noted that as used herein and in the appended claims, the singular forms "a", "an", and "the" include plural reference unless the context clearly dictates otherwise. Thus, for example, reference to a "record" is a reference to one or more records and equivalents thereof known to those skilled in the art, and so forth. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications mentioned herein are incorporated by reference. Nothing herein is to be construed as an admission that the invention is not entitled to antedate such disclosure by virtue of prior invention.

For purposes of this application, "contactless" or "wireless" shall mean any communication method or protocol, including proprietary protocols, in which data is exchanged between two devices without the need for the two devices to be physically coupled. For example, "contactless" or "wireless" shall include radio frequency, infrared, laser, any other communication means, and the use of any protocols, such as proprietary protocols, with such communication means.

For purposes of this application, "card" or "device" shall mean an integrated circuit card which has been enabled to communicate with an external device over a wireless interface, an electronic device which has been enabled to communicate with an external device over a wireless interface, or any other device which is capable of exchanging data with an external device without physically coupling with said external device. For example, and without limiting the foregoing, "card" or "device" shall include an integrated circuit or so called smartcard, a memory chip card comprising flash or other memory means, a personal digital assistant, or a cellular phone. Preferably, a "card" or "device" will also be capable of communicating with an external device through physical contacts as well.

For purposes of this application, "data exchange environment" shall mean the means by which applications are logically stored and organized on the card. For example, "data exchange environment" may include lists or root directories of one or more applications deployed on the device which may be organized according to functionality, processing requirements, the issuer or service provider which deployed the applications, or by some other criteria.

The present invention provides a method by which a card can be used to accomplish a variety of transactions over a wireless interface. It is anticipated that a card used in the present invention does not operate solely in a contactless environment. Rather, it is expected that the card of the present invention may also be utilized in a contact-based environment in which the card must be physically placed in contact with (i.e. swiped through) a card reader. However, the methods of the present invention are equally effective if the card communicates with a terminal or card reader solely by way of a wireless interface.

As shown in FIG. 1, the present invention provides a mechanism for conducting a wireless transaction within the existing environment for credit or debit transactions with only minimal equipment changes. The card 101 is presented by the cardholder to a card reader 105. The card 101 communicates with the card reader 105 via wireless communication 110 such as radio frequency waves or infrared. The card reader 105 is connected to a terminal 115 or merchant computer which receives data from one or more card readers 105. Optionally, the card reader 105 and the terminal 115 can be combined into a single device which performs both functions. The terminal 115 in turn communicates data across a distributed communications network 120 to an issuer or service provider computer 125.

The interaction between the card and the terminal is depicted in FIG. 2. As shown in FIG. 2, the transaction is initiated when the cardholder presents the card to the terminal 200. The presentation of the card to the terminal may include the cardholder bringing the card within a certain distance of the card reader (for a contactless transaction). The presentation of the card to the card reader may also include the cardholder bringing the card into contact with the terminal (for a contact-based transaction). Once the card is presented to the terminal 200, the first decision point in FIG. 2 is encountered in which the data exchange environment is selected 205. For example, the data exchange environment selected, may be the Proximity Payment Systems Environment, or PPSE, which comprises a list of supported Application Identifiers (AID), Application Labels (which provide identifying information regarding the application) and Application Priority Indicators. The second decision point is encountered next requiring a determination whether the requested transaction should take place via a contact interface or a contactless interface 210. Thereafter, the third and final decision point of FIG. 2 is encountered. This decision point requires a determination of the format for the data which will be exchanged in the transaction 215. For example, the data may be formatted for a magnetic stripe transaction or may be formatted for a chip data transaction. Once the data format is selected, transaction data is exchanged between the card and the terminal 220 until the transaction has completed 225.

Figure 3:
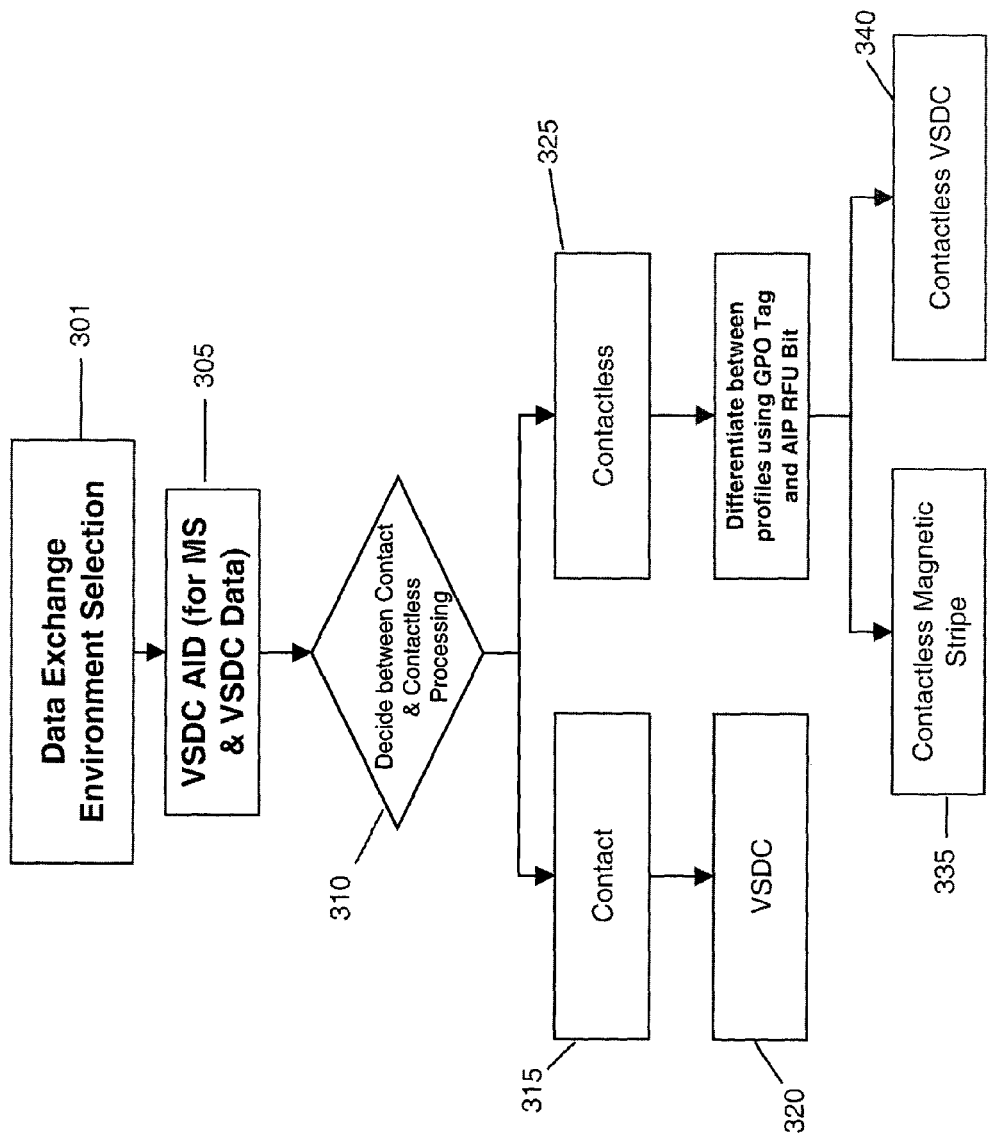
FIG. 3 illustrates an exemplary transaction flow for the processing occurring on an electronic device, such as an integrated circuit card, which is enabled to engage in a wireless transaction according to an embodiment of the present invention.

When the card is presented to the terminal at step 200 in FIG. 2, the card begins a sequence of processing steps and decisions designed to appropriately select the application, interface and data profile for use in the transaction. FIG. 3 illustrates the transaction flow which occurs on the card in the present invention. The card based processing begins with selection of the data exchange environment to be utilized in the transaction 301. Once the data exchange environment is selected, data identifying the applications accessible in that data exchange environment is communicated to the terminal 305. This data may be communicated to the terminal by incorporating said data into the AID for a chip data based transaction irrespective of which type of applications are available. Once this has occurred, the card selects which type of processing to use for the transaction, which selection may be based, in whole or in part, on the interface over which the transaction will occur 310. When the contact processing is selected 315, by placement of the card in the contact interface of the terminal to begin the data transmission process, the transaction will be processed as a chip data transaction, such as a VSDC transaction 320. When the contactless processing is selected 325, the card must then transmit data with the appropriate profile to permit appropriate handling by the terminal 330. Profile selection, as described in more detail below in conjunction with FIG. 5 and FIG. 6, allows the card to inform the terminal of whether a contactless magnetic strip data 335 or a contactless chip data 340 will be used to perform the transaction.

The selection of the data exchange environment, as discussed above, may take any form or follow any methodology now known or hereafter developed. For example, the present invention may utilize the Payment System Environment, or PSE, currently utilized in contact-based transactions modified to operate over a wireless interface or the Proximity Payment System Environment, or PPSE, for selecting the applications over a wireless interface. In a PPSE data exchange environment, the application which is selected for a given transaction is determined by the terminal. Standard PPSE operates by the terminal requesting information on the applications supported by the card. The card responds with the AID's for the supported applications and priority indicators for each application. The priority indicators indicate the card's preferences for which application should be used in the transaction. The terminal receives this information from the card and determines which of the applications supported by the card are also supported by the terminal. The terminal then selects the mutually supported application with the highest priority indicator as the application for use in the given transaction.

Figure 4:
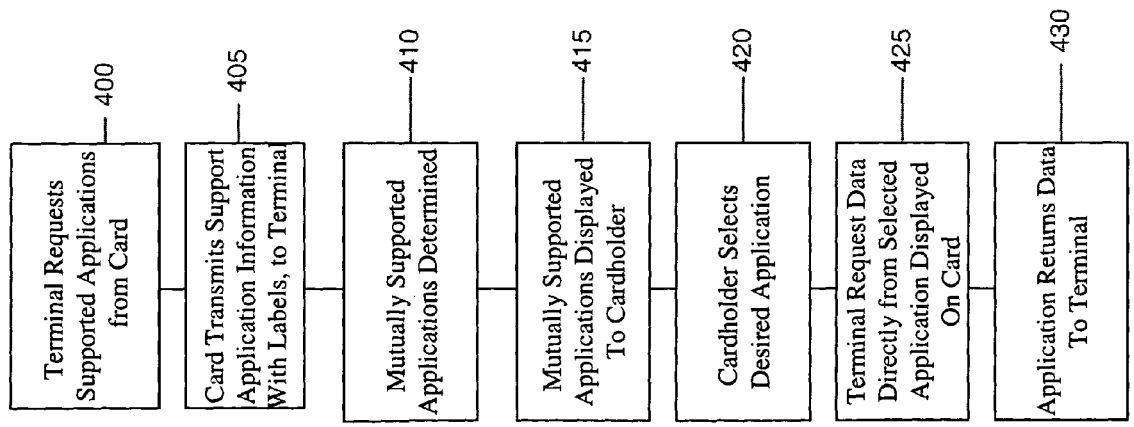
FIG. 4 depicts an exemplary method of selecting an application to be used in a credit-based transaction according to an embodiment of the present invention.

In a preferred embodiment, the data exchange environment may comprise an improved PPSE. The improved PPSE of the present invention, as described below, allows the cardholder to make the selection of the application to be used in the transaction rather than allowing that selection to be performed automatically by the terminal. The improved PPSE, as shown in FIG. 4, begins with the terminal requesting that the card, such as via a SELECT command, to identify the applications deployed on the card 400. The card transmits 405 this information over the wireless interface. The information transmitted comprises an identifier for each application and application labels which comprise information which can be used for identifying the applications to the cardholder. Application labels may include data such as a common name for the application. The terminal then determines which of the applications supported by the card are also supported by the terminal 410. The mutually supported applications are then displayed to the cardholder 415 who selects the application to use in the transaction 420. The terminal then requests data, directly from the selected application 425. The application returns such data 430, and the application is initiated and data exchanged between the card and the terminal as required by the application selected.

Figure 5:
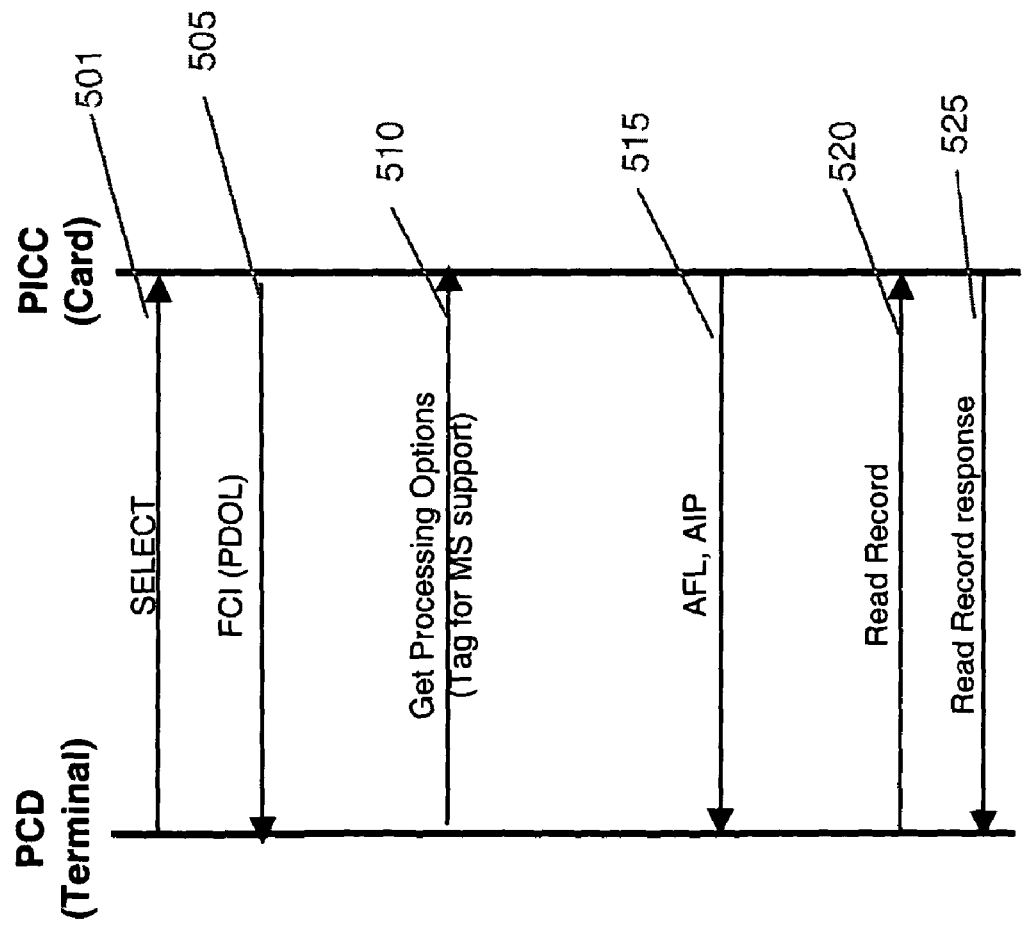
FIG. 5 illustrates an embodiment of the processing steps between an electronic device and a terminal in which the electronic device apprises the terminal of the data exchanged in a contactless transaction.

Since the card can supply the terminal with either magnetic stripe data or chip data, it is necessary that both the card and the terminal agree on the format and type of data being exchanged. The card will, of course, be aware of the format and type of data as the selection of the application and the interface occurs on the card. The format and type of data (also referred to as the profile of the data) is identified and transmitted to the terminal as shown in the embodiment of FIG. 5 or the embodiment of FIG. 6. As shown FIG. 5, the terminal requests data from the card, such as via a SELECT command,

501 regarding the processing options for the transaction. The card responds with a list of processing options 505 which comprises one or more data tags requesting the terminal to provide data to the card which identifies the capability of the terminal to conduct magnetic stripe data transactions, chip data transactions, transactions where approval occurs offline including card-based approval transactions, all such types of transactions, or processing for any other data profile or processing capabilities. For example, the processing options may be set forth in a processing data objects list or PDOL. The terminal responds by indicating which transaction and/or data profiles it supports 510. For example, the terminal may provide this information to the card along with a Get Processing Options command. The card replies with two data objects 515. The first data object is a list of files and records associated with either a magnetic stripe based transaction or a chip data transaction (this file list may be referred to as the application file locator or AFL). The second data object is a list of functions to be performed in processing the transaction. This list of functions (also referred to as the Application Interchange Profile or AIP) indicates the capability of the card to support certain functions in the selected application. The AIP transmitted by the card will include an indicator, which indicates whether the card intends to send data in magnetic stripe format, chip data format or some other format supported by both the card and the terminal. The terminal then requests from the card 520, and the card provides 525, the appropriately formatted record. This method may advantageously enable the terminal to anticipate the data format sent by the card. As such, the terminal may not need to parse the data record to determine the format of the data.

Figure 6:
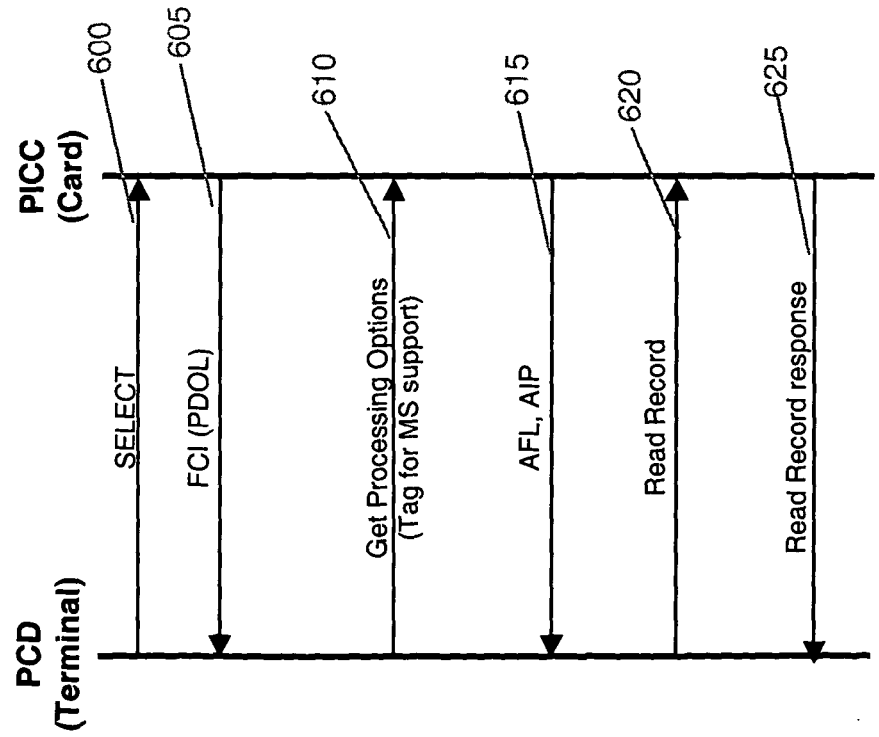
FIG. 6 illustrates an alternate embodiment of the processing steps between an electronic device and a terminal in which the electronic device apprises the terminal of the profile of the data exchanged in a contactless transaction.

In the alternate embodiment as shown in FIG. 6, the terminal requests from the card, such as via a SELECT command, 600 information regarding the processing options for the transaction. The card responds with a list of processing options 605 which comprises one or more data tags requesting the terminal to provide data to the card which identifies the capability of the terminal to conduct magnetic stripe data transactions, chip data transactions, transactions where approval occurs offline including card-based approval transactions, all such types of transactions, or any other data profile or processing capabilities. For example, the processing options may be set forth in a processing data objects list or PDOL. The terminal responds by indicating which transaction and/or data profiles it supports 610. For example, the terminal may provide this information to the card along with a Get Processing Options command. The card transmits an AFL and an AIP to the terminal 615. The terminal then requests from the card, a data record in either magnetic stripe format or chip data format 620. The card returns a data record with the necessary data formatted for either a magnetic stripe transaction or a chip data transaction 625. Included with the data record returned may be a data tag. The presence or absence of the data tag will be an indicator to the terminal of the profile of the data being received. For example, in an embodiment, the presence of the data tag indicates that the data received is in a magnetic stripe format while the absence of the data tag indicates the data has been sent in chip data format. In an alternate embodiment, the tag may be present if the data is sent in chip data format and may not be present if the data is sent in magnetic stripe format. In either embodiment, the terminal is not aware of the data profile until the data is received from the card and processed by the terminal to interpret the tag.

In an alternate embodiment, the present invention may be utilized when a plurality of cards are placed in wireless communication with the terminal. For example, a cardholder may present his or her entire wallet in proximity to the terminal thus allowing each of the cards within the wallet to be in wireless communication with the terminal. In this embodiment, a plurality of cards are discovered by the terminal. The terminal then polls each of the cards to build a list of supported applications which are deployed on the plurality of cards as follows. Utilizing anti-collision procedures, the terminal selects a first card. The applications deployed on the first selected card and supported by the terminal are then identified on a list of available applications. The card is then placed in a "half" state and the terminal determines if there are additional cards in communication with the terminal. This process is then repeated for each additional card in communication with the terminal. At the conclusion of this processing, the terminal will have compiled a list of all available applications deployed on any of the plurality of cards in wireless communication with the terminal which applications are also supported by the terminal. From this list of applications, the application to be used in processing the transaction may be selected utilizing any of the application selection processes of the present invention including use of priority indicators or displaying a list to the cardholder for selection.

A transaction in the present invention may be conducted using no security techniques or one or more security techniques. Security techniques such as data encryption, dynamic data authentication, static data authentication, and cardholder verification methods may be used as part of a transaction in the present invention. Further, in a preferred embodiment a method for conducting dynamic data authentication where the card need not remain in wireless communication with the terminal is included as part of the present invention. In the dynamic data authentication of the preferred embodiment, also referred to herein as fast dynamic data authentication, the card creates a hash of the magnetic stripe data on the card and includes that hashed data in the ICC Certificate which is utilized with standard dynamic data authentication (DDA). The terminal receives data from the card comprising the magnetic stripe data and the DDA data (including the ICC Certificate). Once this data has been received by the terminal, the terminal needs no further data from the card for authentication purposes. Accordingly, the from the cardholder's perspective the transaction is perceived to be faster as the cardholder can remove the card from communication with the terminal once said data has been transmitted. The terminal then continues processing to authenticate the data received from the card and perform the processing for approval or disapproval of the transaction. It will be apparent to one of ordinary skill in the art that such an authentication method will be particularly advantageous in an environment where quick transaction speeds (or the perception of quick transaction speeds by the cardholder) are required or beneficial.

Although the present invention has been described in conjunction with magnetic stripe data transactions or other data transactions it will be appreciated by one of ordinary skill in the art that the present invention will be effective with any type of transaction or processing which may be deployed on a card or device. For example, applications in which approval or disapproval of the transaction is determined offline (i.e., without the requirement that a third party to the transaction, such as an issuer, approve the transaction) by either the terminal, the card, or a combination of the card and the terminal are within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of performing a transaction comprising:
   placing a first device in wireless communication with a second device;
   selecting an application deployed on the first device which will be utilized to conduct the transaction, wherein the application selected is supported by the second device;
   determining transaction processing capabilities supported by the second device;
   communicating application data from the first device to the second device, wherein the application data is selected in response to the transaction processing capabilities; and
   processing the application data as required by the application to approve or disapprove the transaction.

2. The method of claim 1 wherein the first device is an integrated circuit card.

3. The method of claim 2 wherein said integrated circuit card comprises an antenna for communicating with the second device over a wireless interface.

4. The method of claim 1 wherein the first device is a cellular telephone.

5. The method of claim 1 wherein the first device is a personal digital assistant.

6. The method of claim 1 wherein the first device comprises:
   means for storing application data; and
   means for communicating with the second device over a wireless interface.

7. The method of claim 1 wherein the second device comprises:
   a reader for receiving data from the first device over a wireless interface.

8. The method of claim 1 wherein the second device comprises:
   a point of sale terminal.

9. The method of claim 1 wherein the second device comprises a hardware security key.

10. The method of claim 1 wherein the first device communicates with the second device by radio frequency.

11. The method of claim 1 wherein the first device communicates with the second device by infrared communication.

12. The method of claim 1 wherein the first device communicates with the second device by laser communication.

13. The method of claim 1 wherein the step of determining transaction processing capabilities comprises:
   informing the first device of the application selected for use in performing the transaction;
   communicating a request from the fist device to the second device wherein said request seeks data on the capability of the second device to perform particular transaction types; and
   communicating the transaction processing capabilities from the second device to the first device.

14. The method of claim 1 wherein the application data comprises security data.

15. The method of claim 14 wherein the security data comprises data for static data authentication.

16. The method of claim 14 wherein the security data comprises data for dynamic data authentication.

17. The method of claim 1 wherein the step of processing the application data occurs offline.

18. The method of claim 1 wherein the step of selecting the application comprises:
   transmitting from the first device to the second device a list comprising:
   applications supported by the first device; and
   a priority indicator for each application, wherein the priority indicator indicates the preference that the associated application will be selected for use in performing the transaction;
   comparing the applications supported by the first device with the applications supported by the second device; and
   selecting the application mutually supported by the first device and the second device with the highest priority indicator as the application for use in approving or disapproving the transaction.

19. The method of claim 1 wherein the step of selecting the application comprises:
   transmitting from the first device to the second device data identifying the applications supported by the first device;
   comparing the applications supported by the first device with the applications supported by the second device;
   displaying applications mutually supported by the first device and the second device to a user of the first device; and
   selecting the application to be used to approve or disapprove the transaction, wherein such selection is performed by the user of the first device.

20. The method of claim 1 wherein the second device is informed of the application data format prior to receiving the application data.

21. The method of claim 1 wherein the second device determines the application data format by parsing the application data for an indicator.

22. The method of claim 21 wherein the presence of the indicator informs the second device the application data is formatted for magnetic stripe transactions.

23. The method of claim 21 wherein the absence of the indicator informs the second device the application data is formatted for magnetic stripe transactions.

24. A method for selecting an application for use in approving or disapproving a transaction over a wireless interface comprising:
   transmitting the applications supported by a first device to a second device in wireless communication with the first device;
   comparing the applications supported by the first device to applications supported by the second device;
   displaying on the second device the mutually supported applications to a user of the first device;
   selecting a desired application from the mutually supported applications displayed on the second device, wherein such selection is performed by the user of the first device;
   communicating the desired application from the second device to the first device; and
   communicating from the first device to the second device data necessary for the desired applications to approve or disapprove the transaction.

25. The method of claim 24 wherein the first device is an integrated circuit card.

26. The method of claim 25 wherein said integrated circuit card comprises an antenna for communicating with the second device over a wireless interface.

27. The method of claim 24 wherein the first device is a cellular telephone.

28. The method of claim 24 wherein the first device is a personal digital assistant.

29. The method of claim 24 wherein the first device comprises:

means for storing application data; and means for communicating with the second device over a wireless interface.

30. The method of claim 24 wherein the second device comprises:

a reader for receiving data from the first device over a wireless interface.

31. The method of claim 24 wherein the second device comprises:

a point of sale terminal.

32. The method of claim 24 wherein the second device comprises a hardware security key.

33. The method of claim 24 wherein the first device communicates with the second device by radio frequency.

34. The method of claim 24 wherein the first device communicates with the second device by infrared communication.

35. The method of claim 24 wherein the first device communicates with the second device by laser communication.

* * * * *